A. WRIGHT.
Vehicle Chafing-Iron.
No. 159,373. Patented Feb. 2, 1875.
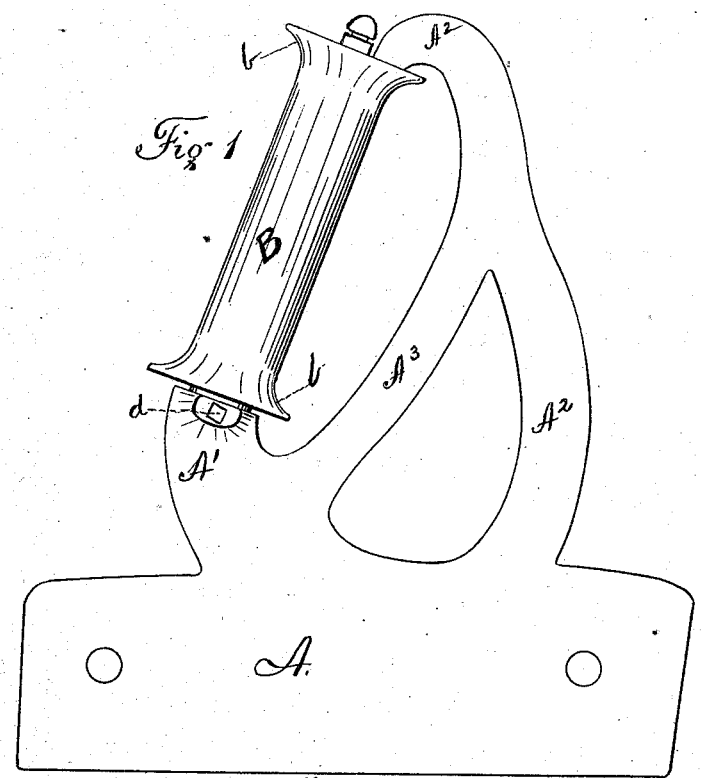
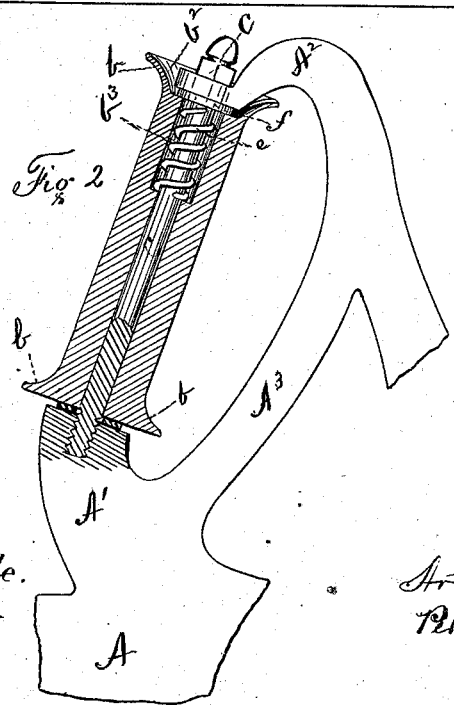

UNITED STATES PATENT OFFICE.

ARTHUR WRIGHT, OF BATH, MAINE.

IMPROVEMENT IN VEHICLE CHAFING-IRONS.

Specification forming part of Letters Patent No. 159,373, dated February 2, 1875; application filed December 10, 1874.

*To all whom it may concern:*

Be it known that I, ARTHUR WRIGHT, M. D., of the city of Bath, in the county of Sagadahoc and State of Maine, have invented certain new and useful Improvements in Chafe-Iron for Wheeled Vehicles; and I do hereby declare the following to be a full, clear, and exact description of the invention, such as will enable others skilled in the art to which it pertains to make and use it, reference being had to the accompanying drawings, which form part of this specification.

Figure 1 represents a plan view of a chafe-iron embodying my invention. Fig. 2 is a sectional view, showing interior of the roller and its arrangement with the axle, spiral spring, and their attachments to the arms of the frame.

Like letters refer to like parts.

The object of my invention is to provide a chafe-iron for wheeled vehicles which shall be a better guard against friction of the wheel, simpler in construction, stronger, and more durable for use, and cheaper in cost than any heretofore known or used.

My invention consists in certain details of construction first described and afterward pointed out in the claims.

A is the frame of the chafe-iron; B, the roller; C, the bolt or axle for the roller; $d$, a set-screw; $e$, a spiral spring; and $f$, a washer. The roller B is formed as shown in Figs. 1 and 2, with a concave flange, $b$, on both ends, which prevents the wheel of the vehicle freeing itself when once engaged until freed by a change of direction, and a cavity, $b^2$, which receives and protects the end of the arm $A^2$, and partially covers the head of the bolt C; and an enlarged bore, $b^3$, to receive the spring $e$. The washer $f$ is placed between the end of the roller B and the arm $A^2$, to prevent wear by friction, and serves to hold the spring $e$ in place. The spring prevents noise by rattling of the roller. The frame A is cast in one piece, and so formed that the axis of the roller B shall be parallel, or as near as may be, with the line of the axis of the wheel when it engages the roller. The frame is also cast right-and-left handed, and may be of steel or malleable iron. I prefer the roller of steel. The construction of the roller with the concave end, as shown in Fig. 2, prevents the introduction of dust or dirt between the parts having friction, and the wear arising from such cause.

Having thus fully described my invention, I claim—

1. The roller B, having concave flanges $b$, cavity $b^2$, and enlarged bore $b^3$, as and for the purpose described and shown.

2. The frame A, roller B, bolt C, screw $d$, spring $e$, and washer $f$, all combined to operate substantially as and for the purpose specified.

In testimony that I claim the foregoing I have hereunto set my hand and seal this 27th day of November, 1874.

ARTHUR WRIGHT. [L. S.]

Witnesses:
   HENRY M. BOVEY,
   WILLIAM WILLIS.